D. C. SUMNER.
Cloth-Shearing Machine.

No. 216,984. Patented July 1, 1879.

Witnesses.  Inventor
Fred. A. McClure  Dwight C. Sumner
Sam'l P. R. Triscott  By Chas. H. Burleigh
  Att'y

UNITED STATES PATENT OFFICE.

DWIGHT C. SUMNER, OF MILLBURY, MASSACHUSETTS.

IMPROVEMENT IN CLOTH-SHEARING MACHINES.

Specification forming part of Letters Patent No. 216,984, dated July 1, 1879; application filed May 27, 1878.

*To all whom it may concern:*

Be it known that I, DWIGHT C. SUMNER, of Millbury, in the county of Worcester and State of Massachusetts, have invented certain new and useful Improvements in Cloth-Shearing Machines; and I declare the following to be a description of my said invention sufficiently full, clear, and exact to enable others skilled in the art to which it appertains to make and use the same, reference being had to the accompanying drawings, which form a part of this specification, and in which—

Figure 6:
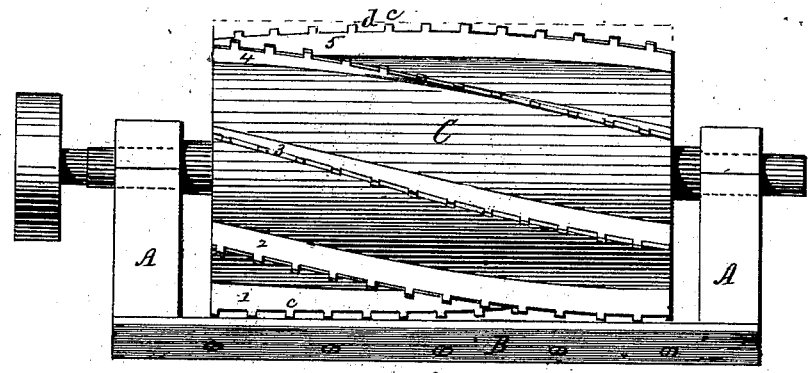
Figure 5:
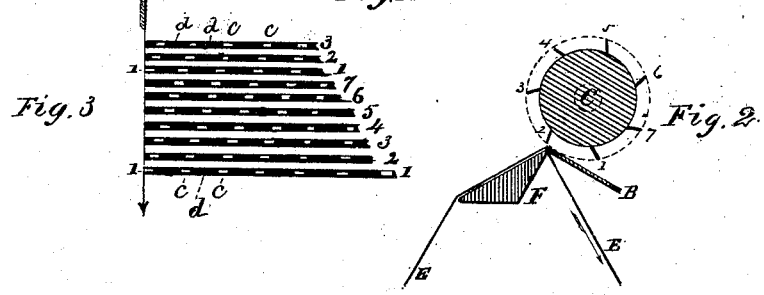
Figure 4:
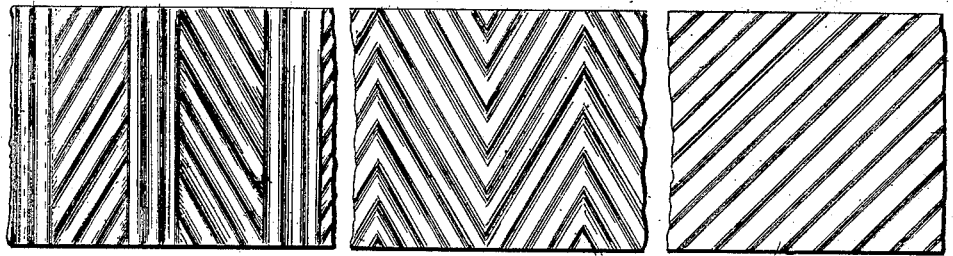

Figure 1 represents a front view of such parts of a cloth-shearing machine as are necessary to illustrate the nature of my improvements. Fig. 2 is a sectional diagram showing the relative positions of the working parts in the machine. Fig. 3 is a cutter-face diagram, showing the manner in which the cutting-sections of the blades follow each other; and Figs. 4, 5, and 6 illustrate styles of finish effected by my invention.

This invention relates to an improvement in mechanism for finishing that class of cloth or pile fabric wherein the ornamentation is effected by shearing; and my invention consists, first, in a cylinder or revolver for cloth-shearing machines having sectional or recessed cutting-blades, the cutting-sections of which are arranged in helical order or in spiral series about the cylinder, as hereinafter more fully described; second, in the combination, with the ledger-blade and cloth-rest in a cloth-shearing machine, of a cylinder or revolver having notched or recessed shearing-blades with cutting points or surfaces disposed in helical order around said cylinder, as and for the purposes hereinafter explained.

This improvement is applicable to ordinary cloth-shearing machines, and it will be understood that portions of the mechanism not herein shown or described may be constructed and operated in the usual manner.

In the drawings, A denotes the adjustable top frame of a shearing-machine. B indicates the stationary ledger-blade; C, the revolver or blade-cylinder, provided with the curved blades 1 2 3 4 5 6 7, the edges of which have raised cutting-sections $c$ and recesses or depressions $d$. The cutting-sections $c$ of the several blades I arrange in helical manner about the cylinder C, or so that they follow each other in a spiral series, each succeeding section being offset from the line of revolution of the one in advance of it, as indicated in the diagram, Fig. 3. By this arrangement of the cutting-sections $c$ the shearing action against the ledger-blade B effects the production of diagonal lines in the pile or face fibers of the cloth E as it is fed forward over the straight cloth-rest F, the inclination of the diagonal depending on the relative speed of the shearing and feeding mechanism.

Right-hand or left-hand diagonal lines may be formed, accordingly as the helical arrangement of the cutting-sections $c$ are set toward the right or left hand end of the blade-cylinder. The spirally-arranged cutting points or sections $c$ may be formed in continuous series throughout the entire length of the cylinder, or on certain definite portions of its length, as desired, for producing long or short diagonal lines on the surface of the cloth.

Plain diagonal, as shown in Fig. 4, is formed by arranging the cutting-sections $c$ in continuous helical series from end to end of the cylinder. By forming the sections $c$ in alternating right and left hand helical portions of determined lengths along the blade-cylinder, alternating diagonals, as shown in Fig. 5, may be produced; while by forming the sections $c$ in helical series only on occasional portions of the cylinder or revolver C, the diagonal is produced as occasional stripes, as illustrated in Fig. 6.

The diagonal ornamentation formed by the helically-arranged cutting-sections is susceptible of very fine and delicate delineation on the goods, and produces a very desirable finish at slight expense, while the style of the diagonal design or patterns which can be produced by mechanism such as herein described admits of considerable variety, since the pattern may be varied by a modification in the pitch or direction of the helical curve on which the cutting-points are arranged; also by change in the width or relative sizes of the cutting-sections and recesses, and by variations in the movement of the cloth past the shearing-blades.

I am aware that diagonal lines have heretofore been made in the pile of fabrics by shearing with ordinary blades, by the aid of a spiral revolving cloth-rest in place of the straight rest F, and I do not, therefore, make claim, broadly, to the production of diagonal lines. Neither do I herein make claim to the invention of serrated or recessed blades; but

What I claim as of my invention, and desire to secure by Letters Patent, is—

1. A revolver or blade-cylinder for cloth-shearing machines having serrated or sectional cutting-blades, the cutting-sections thereof being arranged in helical order about the cylinder, substantially as and for the purpose set forth.

2. In a cloth-shearing machine, the combination, with the ledger-blade and cloth-rest, of a cylinder the blades of which are notched as described, whereby a series of cutting points or surfaces are arranged spirally around said cylinder, substantially as set forth.

3. A cylinder for shearing-machines, the blades of which are notched as described, whereby a series of cutting points or surfaces are developed around said cylinder in spiral form, substantially as set forth.

Witness my hand this 23d day of May, A. D. 1878.

DWIGHT C. SUMNER.

Witnesses:
CHAS. H. BURLEIGH,
GEO. M. REED.